Figure 1:
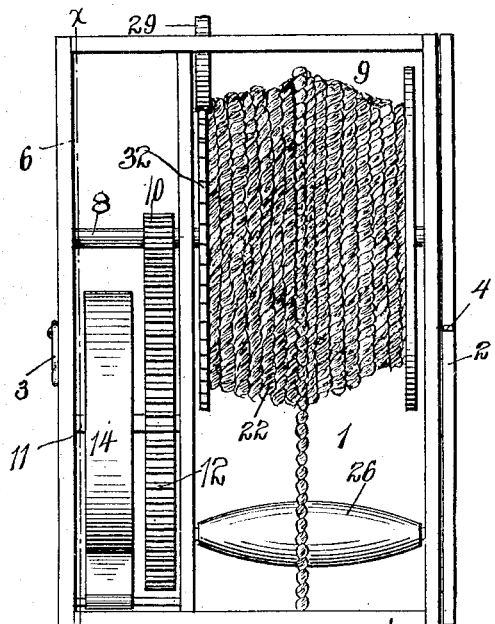

No. 856,684. PATENTED JUNE 11, 1907.

C. D. DITTMAN.
CLOTHES LINE REEL.
APPLICATION FILED JUNE 30, 1906.

Witnesses:
Jesse C. Miller
R. H. Butler

Inventor:
Charles D. Dittman.
by H. C. Everts Co.
Attorneys.

THE NORRIS PETERS CO., WASHINGTON, D. C.

UNITED STATES PATENT OFFICE.

CHARLES D. DITTMAN, OF PITTSBURG, PENNSYLVANIA.

CLOTHES-LINE REEL.

No. 856,684.  Specification of Letters Patent.  Patented June 11, 1907.

Application filed June 30, 1906. Serial No. 324,244.

*To all whom it may concern:*

Be it known that I, CHARLES D. DITTMAN, a citizen of the United States of America, residing at Pittsburg, in the county of Allegheny and State of Pennsylvania, have invented certain new and useful Improvements in Clothes-Line Reels, of which the following is a specification, reference being had therein to the accompanying drawings.

This invention relates to certain new and useful improvements in clothes line reels, and the invention has for its object to provide a housing for a clothes line reel.

Another object of this invention is to provide a simple and inexpensive spring-held reel and novel means for locking said reel in a fixed position.

With these and other objects in view, the invention consists in the novel construction, combination and arrangement of parts to be presently described and specifically pointed out in the claims.

Reference now being had to the drawing forming part of this specification, like numerals of reference designate similar parts in the several views, in which:—

Figure 2:
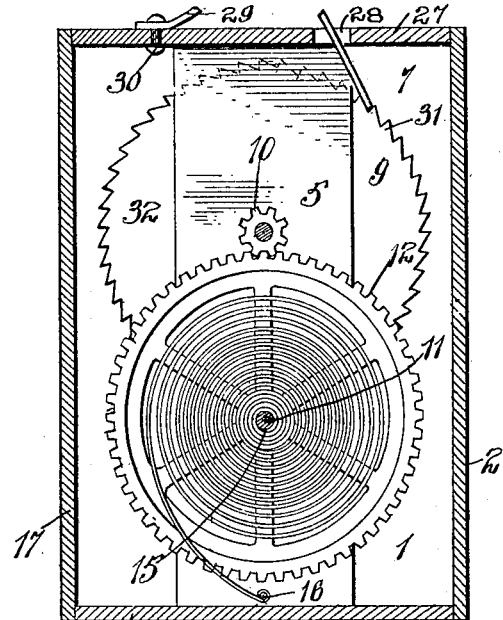
Figure 3:
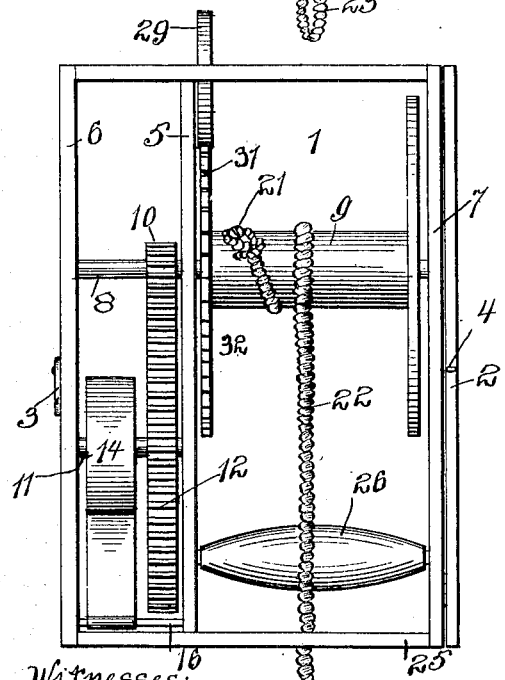
Figures 4, 6:
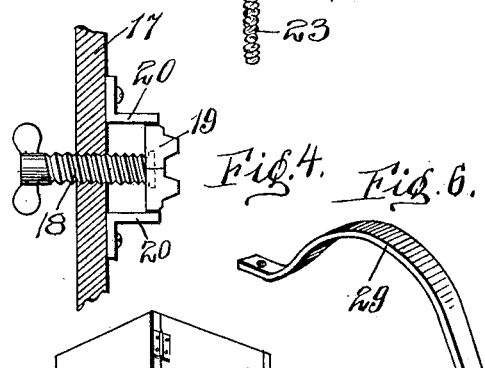
Figure 5:
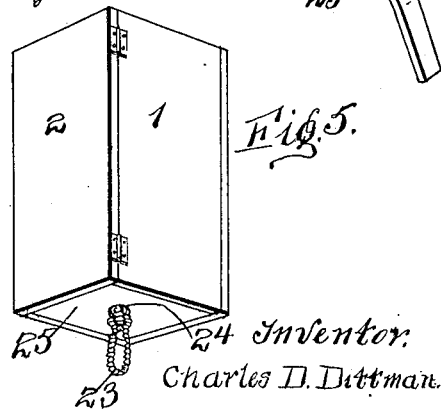

Figure 1 is a front elevation of my improved reel and its housing, the door thereof being open, Fig. 2 is a vertical sectional view taken on line $x$—$x$ of Fig. 1, Fig. 3 is a front elevation of the reel and housing, illustrating a line attached to the reel, Fig. 4 is a side elevation of a modified form of locking member that can be used in connection with the reel, Fig. 5 is a perspective view, upon a small scale of my improved reel housing, and Fig. 6 is a perspective view of the combined locking member and handle of my improved reel.

The housing of my improved reel consists of a casing or box 1 having a hinged door or lid 2, normally held in a closed position by a conventional form of hook 3 and eye 4.

In the casing or box 1 is arranged a vertically disposed plate 5 contiguous to the side wall 6 of said box or casing. Journaled in the plate 5, side wall 6 and side wall 7, is a shaft 8, upon which is fixed a reel 9 and a pinion 10, said pinion being located between the side wall 6 and the plate 5, while the reel 9 is located between said plate and side wall 7.

In the side wall 6 and the plate 5, beneath the shaft 8, is journaled a shaft 11, upon which is mounted a large pinion 12 adapted to mesh with the pinion 10 of shaft 8. Surrounding the shaft 11 between the pinion 12 and the side wall 6 is a coiled retracting spring 14, the one end of said spring being fixed to the shaft 11, as at 15, while the other end of said spring is secured to a rod 16 mounted between the side wall 6 and the plate 5.

The top 27 of the casing or box 1 is provided with an opening 28 through which protrudes a combined handle and locking member 29, the one end of said member being secured to the top of the box or casing as at 30. The opposite end of the member is adapted to engage the teeth 31 formed in the periphery of the head 32 of the reel 9. The member 29 is adapted to normally hold the reel 9 stationary, but when said reel is being carried by the locking member or handle, the reel is released.

A modified form of locking member is illustrated in Fig. 4 of the drawing, said member being employed to lock the pinions 12 and 10 from rotation. In this construction I provide the rear wall 17 with a thumb-screw 18 having a loosely mounted toothed pawl 19 upon its inner end adapted to engage the pinion 12. The block 19 is guided in its movement and prevented from rotating by brackets 20 secured upon the inner side of the rear wall 17.

Attached to the reel 9 by a screw 21 or similar fastening means is the end of a clothes line 22, the opposite end of said line forming a loop 23, which prevents said end from passing through the opening 24 formed in the bottom 25 of the box or casing, also provides means for attaching the end of the line to a hook or similar support.

Journaled between the plate 5 and side wall 7 is a roller 26 over which the clothes line 22 passes when being wound or unwound in the box or casing 1.

Through the medium of the retracting spring 14, pinions 12 and 10, the line 22 is normally wound upon the reel. The box or casing is carried by a person, when the line is to be stretched between two points, and the loop 23 having been fixed at one point, the box or casing is carried to the opposite point; the line unwinding and placing the spring 14 under tension. The opposite point having been reached, the handle or locking member 29 is released to engage the head 32 of the reel 9, at which time the line 22 is secured at the point and is ready to be used.

After the line has been used and the line released at its supporting points the member 29 is seized, thus releasing the reel and the spring 14 winds the line upon the reel 9.

My improved reel and housing protects a line when not being used and prevents the line from becoming entangled or injured.

Such changes in the details of construction, as are permissible by the appended claims, may be resorted to without departing from the spirit of the invention.

Having fully described my invention, what I claim as new and desire to secure by Letters Patent, is:—

A clothes line reel comprising a box or casing having a hinged door, a plate mounted in said box, and shaft journaled in said plate and the side walls of said box, a reel fixed upon said shaft and having a line attached thereto, the periphery of one side of said reel being toothed, a pinion mounted upon said shaft, a gear wheel journaled in said box and meshing with said pinion, and a retracting spring located adjacent to said gear and adapted to actuate said gear and pinion, a roller journaled in said box and plate to guide said line, and a combined handle and locking member carried by the body of said box and projecting into the latter to engage said teeth to normally hold said reel against rotation, and the bottom of said box being provided with an opening for the exit of said line.

In testimony whereof I affix my signature in the presence of two witnesses.

CHARLES D. DITTMAN.

Witnesses:
MAX H. SROLOVITZ,
E. E. POTTER.